United States Patent
Takayama

(10) Patent No.: US 6,987,594 B2
(45) Date of Patent: Jan. 17, 2006

(54) OPTICAL SCANNING APPARATUS

(75) Inventor: Hidemi Takayama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/771,401

(22) Filed: Feb. 5, 2004

(65) Prior Publication Data

US 2004/0156084 A1   Aug. 12, 2004

(30) Foreign Application Priority Data

Feb. 7, 2003 (JP) ............................. 2003-030634

(51) Int. Cl.
  *G02B 26/08* (2006.01)
(52) U.S. Cl. ..................... 359/205; 359/204; 359/207; 347/232; 347/244; 347/259
(58) Field of Classification Search ........ 359/204–207, 359/216–219; 347/225, 232–233, 244, 258–259; 358/474, 505
  See application file for complete search history.

(56) References Cited

U.S. PATENT DOCUMENTS

| 6,459,520 B1 | 10/2002 | Takayama | 359/204 |
| 6,501,586 B1 | 12/2002 | Takayama | 359/206 |
| 6,504,558 B1 | 1/2003 | Takayama | 347/132 |
| 6,519,070 B2 | 2/2003 | Takayama | 359/205 |
| 6,643,044 B1 * | 11/2003 | Iizuka | 359/207 |
| 2003/0025784 A1 * | 2/2003 | Sato et al. | |

* cited by examiner

*Primary Examiner*—James Phan
(74) *Attorney, Agent, or Firm*—Fitzpatrick, Cella, Harper & Scinto

(57) ABSTRACT

Provided is an optical scanning apparatus for optically scanning a surface to be scanned, including: a light source unit that emits a beam modulated according to an image signal; a condenser lens for temporarily focusing the beam emitted from the light source unit into an image in a sub-scanning section in the vicinity of a deflection surface of a light deflector; and a scanning optical system for guiding the beam deflected by the light deflector onto the surface to be scanned, in which: in the sub-scanning section, the beam from the condenser lens is incident at an angle with a normal to the deflection surface; and an scanning optical element constituting the scanning optical system has an optical axis eccentric toward a deflection point side of the deflection surface with respect to a transmission position of a principle ray of the beam in a sub scanning direction.

26 Claims, 11 Drawing Sheets

+100%　　　ON AXIS　　　−100%

+100%　　　ON AXIS　　　−100%

OPTICAL SCANNING APPARATUS

BACKGROUND OF THE INVENTION

1. Field of the Invention

The present invention relates to an optical scanning apparatus, in particular, an optical scanning apparatus that allows a polygon mirror as a light deflector to reflect and deflect a beam emitted from light source means, and optically scans a surface to be scanned with the beam through a scanning optical system to record image information. The optical scanning apparatus is suitable, for example, for an image forming apparatus employing an electrophotographic process, such as a laser beam printer (LBP), a digital copying machine, or a multifunction printer.

2. Related Background Art

Up to now, in an image forming apparatus such as a laser beam printer or a digital copying machine, a light deflector composed of, for example, a rotary polygon mirror periodically deflects beams emitted from light source means including a semiconductor laser, for example, after being optically modulated according to an image signal. Subsequently, the deflected beams are converged into a spot shape on a photosensitive recording medium (photosensitive drum) surface using a scanning optical system (scanning lens system) having an fθ characteristic, and the recording medium surface is optically scanned therewith for image recording.

FIG. 19 is a main-part sectional view in a main scanning direction (main-scanning sectional view) of an optical scanning apparatus used in the conventional image forming apparatus of this type.

In FIG. 19, parallel beams emitted from a laser unit 91 including a semiconductor laser enter a cylindrical lens (condenser lens) 92 having a predetermined refractive power only in a sub scanning direction. The parallel beams incident on the cylindrical lens 92 outgo therefrom still in the form of parallel beams in a main-scanning section.

On the other hand, the above parallel beams are converged in a sub-scanning section into an image as a linear image elongated in the main scanning direction, around a deflection surface 93a of a light deflector 93 composed of a rotary polygon mirror. The beams reflected and deflected on the deflection surface 93a of the light deflector 93 are focused into an image in the form of light spot on a photosensitive drum 95 surface as a surface to be scanned by a scanning optical system (fθ lens system) 94 having the fθ characteristic. Thus, the photosensitive drum 95 surface is repeatedly scanned with the light spots. The scanning optical system 94 is constituted of a spherical lens 94a and a toric lens 94b.

In the above optical scanning apparatus, a beam detector (BD) sensor 98 as a light detector is provided for adjusting a timing for the initiation of image formation on the photosensitive drum 95 surface prior to scanning of the light spot on the photosensitive drum 95 surface. The BD sensor 98 receives a BD beam constituting a part of the beams reflected and deflected by the light deflector 93, i.e., the beam at the time of scanning regions other than an image formation region on the photosensitive drum 95 surface, in other words, the beam that has not yet reached the image formation region. The BD beam is reflected by a BD mirror 96 and converged through a BD lens (condenser lens) 97 to enter a BD sensor 98. After detecting a BD signal (synchronous signal) from an output signal of the BD sensor 98, the timing for the initiation of image recording on the photosensitive drum 95 surface is adjusted based on the detected BD signal.

The photosensitive drum 95 is rotated in synchronization with a drive signal of the semiconductor laser inside the laser unit 91 at a constant speed while moving its surface in the sub scanning direction with respect to the scanning light spot.

An electrostatic latent image is thus formed on the photosensitive drum 95. The electrostatic latent image is developed using a known electrophotographic process and transferred onto a transferring material such as paper as a visualized image.

In general, a multiple-image forming apparatus employing the scanning optical system forms images in different colors in plural image forming parts, conveys the paper with conveying means such as a conveyor belt, for example, and multiply transfers the images onto the paper for the image formation. In particular, concerning the formation of a full-color image, which requires multi-color development, even a slight offset at the time of superposing the images leads to a deteriorated image. For example, regarding an image resolution of 400 dpi, even such a small offset as a fraction of 63.5 μm, which value corresponds to one pixel, causes a color drift or a color tint variation to extremely degrade the image.

To cope with the above, up to now, the same scanning optical system has been used for the color development, in other words, the optical scanning is performed with the same optical characteristics to reduce the risk of the image offset. However, this method involves a problem in that it takes a long time to output the multiple image or full-color image. With a view to solving the problems, there is a method of forming images by separate optical scanning apparatuses to obtain the images in respective colors and superposing the images on the paper conveyed by a conveying part.

However, this method involves a fear that the color drift is caused when superposing the images. As a method effective therefor, there is a method of detecting a position of the image and controlling the image forming part to correct the images according to the detection signal (see, for example, JP 01-281468 B).

Meanwhile, in the image forming apparatus for scanning plural photosensitive members with the beams, the same number of scanning optical systems as that of the photosensitive members are generally provided for forming latent images on the plural photosensitive members. In the apparatus, a problem arises in that the optical parts should be provided in a number corresponding to the number of scanning optical systems. In particular, the light deflector (polygon mirror) is an expensive optical part, resulting in increased costs. Also, the scanning optical system with a high-speed operation and a high definition particularly involves a large-sized light deflector as well as needs to have an ability to deflect the beam at a high speed, which causes a more serious problem.

To solve the above problem, proposed is an optical scanning apparatus for deflecting the plural beams with the common light deflector. Also in the optical scanning apparatus that scans the photosensitive member in the sub scanning direction using the common light deflector, it is necessary to provide a mechanism for shifting a scanning position of the beam in the sub scanning direction for improving a precision in superposing the images in the sub scanning direction. As a method of shifting the position, the deflection surface of the light deflector is selected, from which scanning with the beam starts in the sub scanning direction, so that the scanning position of the beam is shifted line by line in the sub scanning direction. The adjustment is thus performed.

Further, in recent years, there is an increasing demand for a compact, low-priced full-color image forming apparatus with a high image quality. To give an example of a system for meeting such a demand, a system employing a single, common light deflector for scanning with the plural beams, is proposed, in which a first lens is commonly used in the scanning optical system, and the beam is allowed to obliquely enter the deflection surface of the light deflector to reduce widths of optical members such as the lens and the polygon mirror in a height direction, thereby realizing cost-reduction as well as a thin, compact scanner.

However, the system allowing the beam to enter the light deflector in the sub-scanning section at an angle with its deflection surface, i.e., a so-called oblique incident optical system encounters problems in that the beam on an image plane (photosensitive drum surface) is turned and an imaging position of the beam varies in the sub scanning direction depending on the scanning position, i.e., a so-called scanning line curvature develops.

The scanning line curvature causes a problem in the LBP that requires high-precision printing. In particular, in the image forming apparatus for forming the full-color image through the multi-development by scanning the different photosensitive drums using a single polygon mirror, the scanning line curvature results in the color drift, which is undesirable.

Also, the turning of the beam undesirably hinders reducing a spot size; the size of the scanning spot should be minimized particularly in the optical scanning apparatus used in the high-definition image forming apparatus.

SUMMARY OF THE INVENTION

The present invention has been made in view of the above and has an object to provide an optical scanning apparatus capable of attaining a satisfactory spot shape on a surface to be scanned and free of a scanning line curvature.

According to a first aspect of the present invention, there is provided an optical scanning apparatus for optically scanning a surface to be scanned, including: light source means; an incident optical system for temporarily focusing a beam emitted from the light source means into an image in a sub-scanning section to form a linear image on a deflection surface of a light deflector; and a scanning optical system for guiding the beam deflected by the light deflector onto the surface to be scanned, in which: the beam from the incident optical system is incident at an angle with a normal to the deflection surface in the sub-scanning section; the scanning optical system has a scanning optical element having a refractive power in the sub-scanning section; and the scanning optical element has an optical axis eccentric toward a deflection point side of the deflection surface with respect to a transmission position of a principle ray of the beam in a sub scanning direction to meet the following expression:

$$(\beta max - \beta min) < P/\Delta L$$

where $\beta max$ represents a maximum value of an imaging magnification in the sub-scanning section of an entire scanning region of the scanning optical system and $\beta min$ represents a minimum value of the imaging magnification in the sub-scanning section of the entire scanning region of the scanning optical system; P represents a pixel size defined according to a resolution in the sub-scanning section; and $\Delta L$ represents a distance between the normal to the deflection surface at the deflection point and the optical axis of the scanning optical element in the sub scanning direction.

According to a second aspect of the present invention, there is provided an optical scanning apparatus for optically scanning different surfaces to be scanned, including: light source means for emitting a plurality of beams; a plurality of incident optical systems for temporarily focusing the plurality of beams emitted from the light source means into an image in a sub-scanning section to form a linear image on a deflection surface of a common light deflector; and a plurality of scanning optical systems for guiding the plurality of beams deflected by the common light deflector onto the different surfaces to be scanned, in which: the plurality of scanning optical systems have scanning optical elements each having a refractive power in the sub-scanning section; the plurality of beams incident on the common light deflector are incident at an angle with a normal to the deflection surface in the sub-scanning section; and the scanning optical elements of the plurality of scanning optical systems each have an optical axis eccentric toward a deflection point side of the deflection surface with respect to a transmission position of a principle ray of each of the plurality of beams in a sub scanning direction to meet the following expression:

$$(\beta max - \beta min) < P/\Delta L$$

where P represents a pixel size defined according to a resolution in the sub-scanning section; $\beta max$ represents a maximum value of a magnification in the sub-scanning section of an entire scanning region of the plurality of scanning optical systems and $\beta min$ represents a minimum value of the magnification in the sub-scanning section of the entire scanning region of the plurality of scanning optical systems; and $\Delta L$ represents a distance between the normal to the deflection surface at the deflection point and the optical axis of the scanning optical element in the sub scanning direction.

Other features of the present invention will be apparent upon reading the following description in conjunction with the accompanying drawings.

DESCRIPTION OF THE PREFERRED EMBODIMENTS

Hereinafter, embodiments of the present invention will be described.

(First Embodiment)

Figure 1:
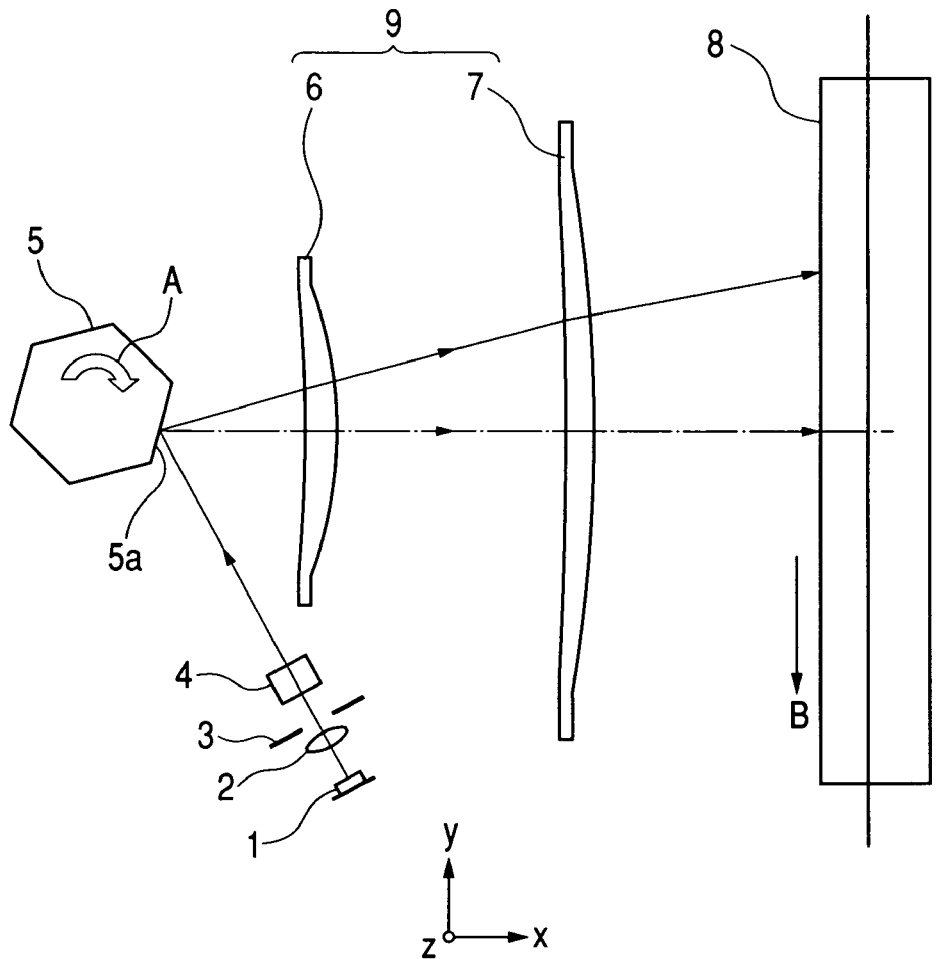
FIG. 1 is a main-scanning sectional view of a first embodiment according to the present invention.
Figure 2:
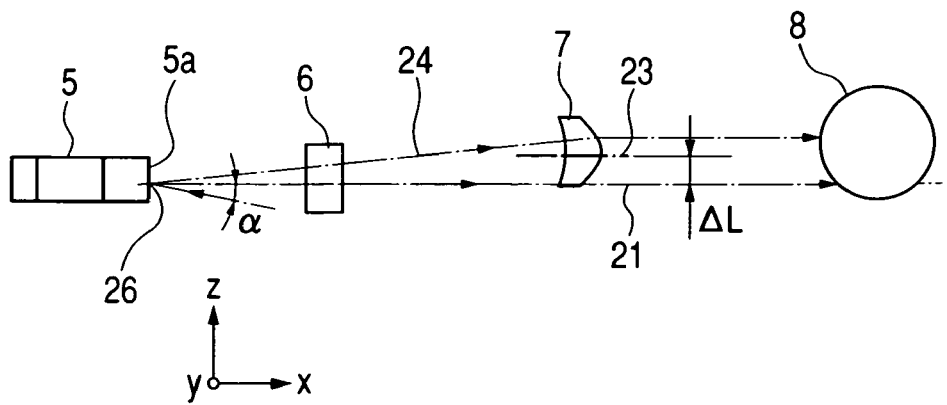
FIG. 2 is a sub-scanning sectional view of the first embodiment according to the present invention.

FIG. 1 is a main-part sectional view (main-scanning sectional view) of a first embodiment according to the present invention. FIG. 2 is a main-part sub-scanning sectional view (sub-scanning sectional view) showing a main part of FIG. 1.

Here, the term "main scanning direction" means a direction perpendicular to a rotation axis of a light deflector and an optical axis of a scanning optical system (direction in which a beam is reflected and deflected (deflected and scanned) by the light deflector). The term "sub scanning direction" means a direction parallel to the rotation axis of the light deflector. Also, the term "main-scanning section" means a plane including the optical axis of the scanning optical system in parallel to the main scanning direction. The term "sub-scanning section" means a section perpendicular to the main-scanning section.

In the figures, reference numeral 1 denotes a light source means which emits a beam modulated according to an image signal and includes, for example, a semiconductor laser; 2, a conversion optical element (e.g., a collimator lens) which converts the beam emitted from the light source means 1 into a substantially parallel beam (alternatively, a substantially divergent or convergent beam); 3, an aperture stop that adjusts an amount of transmitted beam for beam shaping; and 4, a cylindrical lens as a condenser lens, which has a predetermined refractive power only in a sub scanning direction to temporarily focus the beam transmitted through the aperture stop 3 into an image as a substantially linear image in the vicinity of a deflection surface 5a of a light deflector 5 described below in the sub-scanning section. Note that, the respective optical elements such as the collimator lens 2, the aperture stop 3, and the cylindrical lens 4 constitute an incident optical system.

Denoted by 5 is the light deflector, which is constituted of, for example, a polygon mirror as a hexahedral mirror (rotary polygon mirror) and rotated at a constant speed in a direction of the arrow A of FIG. 1 by drive means (not shown) such as a motor.

Denoted by 9 is a scanning optical system (fθ lens system) having a converging function and an fθ characteristic. The scanning optical system 9 is constituted of a first scanning lens 6 as a first imaging means and a second scanning lens 7 as a second imaging means. The scanning optical system 9 focuses the beam reflected and deflected by the light deflector 5 according to image information into an image on a photosensitive drum surface 8 as a surface to be scanned, and has an optical face tangle error correction function which is attained by bringing the deflection surface 5a of the polygon mirror 5 and the photosensitive drum surface 8 into a conjugate relationship in the sub-scanning section.

The first scanning lens 6 of this embodiment is constituted of an anamorphic lens which hardly has the refractive power in the sub-scanning section but has the refractive power mainly in the main-scanning section. The second scanning lens 7 is constituted of an anamorphic lens that has the refractive power mainly in the sub-scanning section, which weakens from an on-axis position to an off-axis position in the sub-scanning section.

Denoted by 8 is the photosensitive drum surface as the surface to be scanned.

In this embodiment, the beams emitted from the semiconductor laser 1 are converted into the substantially parallel beams through the collimator lens 2. The aperture stop 3 adjusts the amount of the beams (light amount) and then the beams enter the cylindrical lens 4. The substantially parallel beams incident on the cylindrical lens 4 partially outgo therefrom as they are in the main-scanning section. Meanwhile, the substantially parallel beams are converged in the sub-scanning section to be temporarily focused into an image on the deflection surface 5a of the polygon mirror 5 as the substantially linear image (linear image elongated in the main scanning direction).

At this time, considering the beam to be incident on the deflection surface 5a of the polygon mirror 5, the beam enters the surface at an angle α with a normal to the deflection surface 5a in the sub-scanning section (oblique incident optical system).

The beams reflected and deflected on the deflection surface 5a of the polygon mirror 5 are focused into an image in the spot shape on the photosensitive drum surface 8 through the first scanning lens 6 and the second scanning lens 7. Here, by rotating the polygon mirror 5 in the direction of the arrow A, the photosensitive drum surface 8 is optically scanned in the direction of the arrow B of FIG. 1 (main scanning direction) at a constant speed. Thus, image recording is performed on the photosensitive drum surface 8 as a recording medium surface.

(Characteristics and Effects of this Embodiment)

Next, characteristics and effects of this embodiment will be described.

In FIG. 2, reference numeral 21 denotes a normal to the deflection surface 5a at a deflection point 26; and 23, an optical axis of the second scanning lens 7 which is eccentric toward the deflection point 26 side of the deflection surface 5a with respect to a beam transmission position 24. The beam transmission position 24 corresponds to a principal ray of the beam. The optical axis 23 is parallel to the normal 21 to the deflection surface 5a.

In this embodiment, the situation where the optical axis 23 is parallel to the normal 21 to the deflection surface 5a is observed when projected in the sub-scanning section.

In this embodiment, the beam from the cylindrical lens 4 enters the deflection surface 5a at the angle α with the normal 21 thereto in the subs-canning section, which may lead to a scanning line curvature. Thus, the imaging magnification is set substantially constant in the sub-scanning section to correct the scanning line curvature, thereby preventing the scanning line curvature. At this time, by decentering the second scanning lens 7 (parallel decentering and/or rotational decentering), the substantially constant imaging magnification is attained in the sub-scanning section with ease.

More specifically, in this embodiment, the optical axis 23 of the second scanning lens 7 is made eccentric toward the deflection point 26 side of the deflection surface 5a with respect to the beam transmission position 24. At the same time, the principal ray 24 of the beam incident on the second scanning lens 7 is allowed to enter the lens at an angle with the optical axis 23 in the sub-scanning section.

In this case, a maximum value of the imaging magnification in the sub-scanning section of the entire scanning region of the scanning optical system 9 is represented as βmax and a minimum value thereof is represented as βmin. A pixel size defined according to a resolution in the sub-scanning section is represented as P. A distance between the normal 21 to the deflection surface 5a at the deflection point 26 and the optical axis 23 of the second scanning lens 7 is represented as ΔL. Under the above conditions, the following relationship is established:

$$(\beta max - \beta min) < P/\Delta L \quad (1)$$

Based on the above, in this embodiment, the imaging magnification is set substantially constant in the sub-scanning section, thereby preventing the scanning line curvature.

In this embodiment, preferably, the scanning line curvature is suppressed to 20 μm or less.

Figure 3:
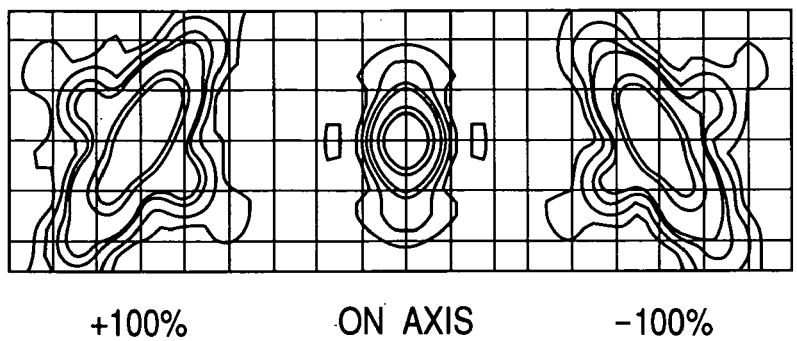
FIG. 3 illustrates a condition of a spot on a photosensitive drum surface in the case of not applying the embodiment of the present invention.

FIG. 3 illustrates a condition of a spot on the photosensitive drum surface in the case of not decentering the lens, i.e., in the case of not applying this embodiment. As shown in FIG. 3, the off-axis spot involves the turning of the beam. At this time, if the photosensitive drum surface position is shifted in the beam direction, the condition of the spot is more deteriorated owing to the turning of the beam.

Figure 4:
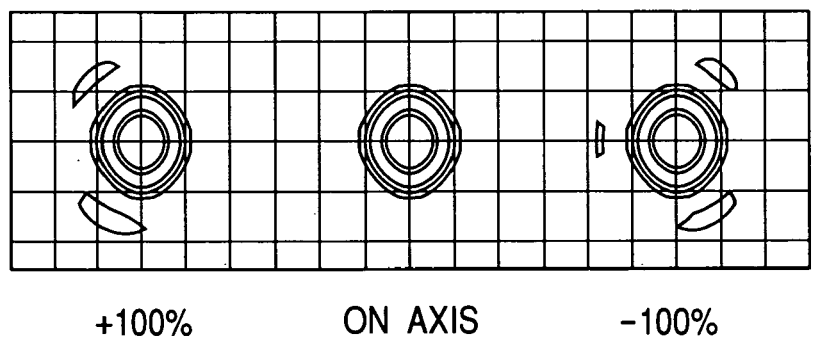
FIG. 4 illustrates a condition of a spot on a photosensitive drum surface according to the embodiment of the present invention.

FIG. 4 illustrates a condition of a spot on the photosensitive drum surface in the case where the second scanning lens 7 is eccentrically arranged in the sub-scanning section according to this embodiment. As shown in FIG. 4, the turning of the beam is caused on the spot and at the same time, the beam deforms. The turning of the beam due to the oblique incidence can be suppressed by eccentrically arranging the second scanning lens 7 with respect to the incident beam.

Figure 5:
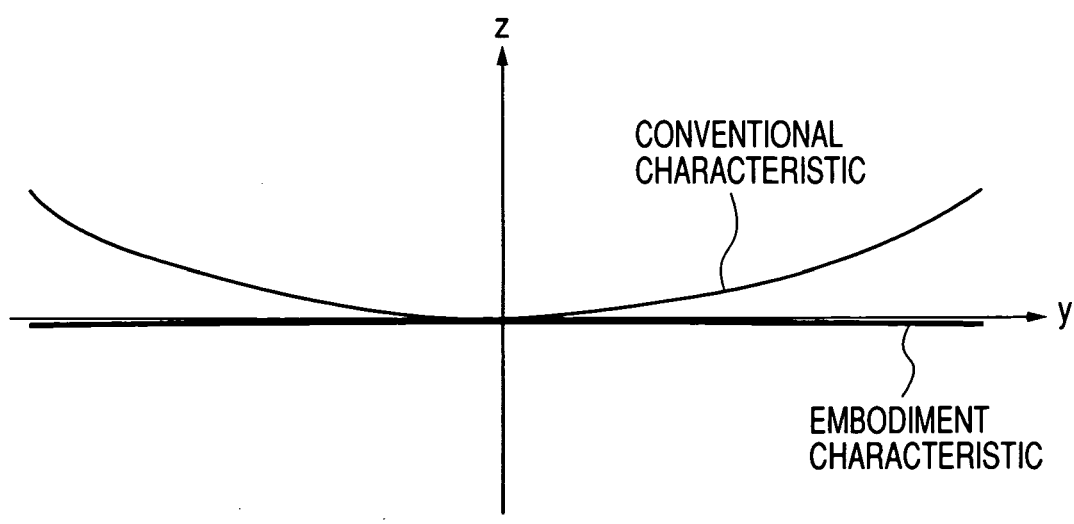
FIG. 5 is a graph representative of a condition of a scanning line curvature according to the embodiment of the present invention and a condition in the case of not applying the embodiment of the present invention.

FIG. 5 is a graph representative of a condition of the scanning line curvature according to this embodiment and a condition in a conventional case (case of not applying this embodiment). As shown in FIG. 5, in a conventional scanning optical system, the beam changes its arrival position according to an image height, whereas in this embodiment, the position of the scanning line in a Z direction does not vary depending on the image height, offering a satisfactory result.

Figure 6:
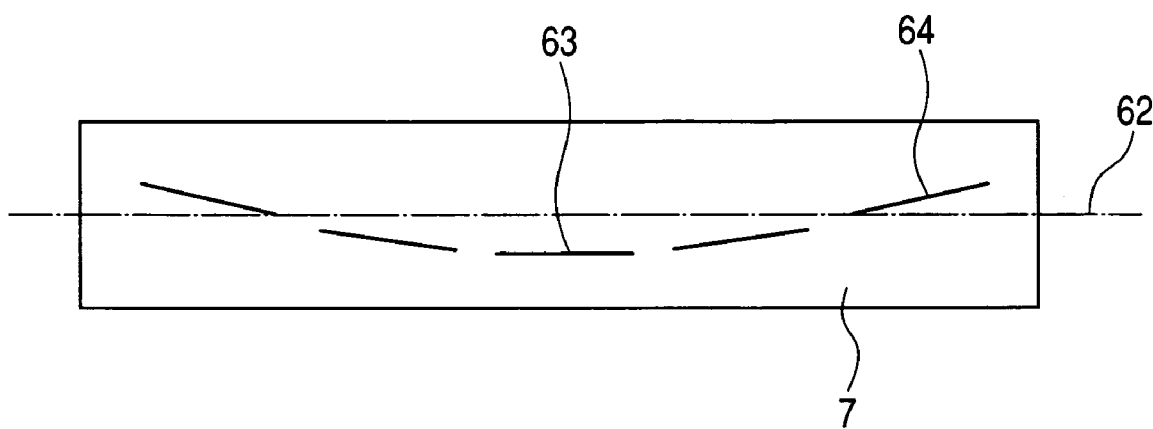
FIG. 6 illustrates why and how a spot is turned.

FIG. 6 illustrates why and how the spot is turned and shows the second scanning lens 7 as viewed from the polygon mirror side. In FIG. 6, reference numeral 62 denotes an optical axis in the sub scanning direction; 63, a marginal ray in the main scanning direction of the beam incident on the second scanning lens 7 on the axis; and 64, a marginal ray in the main scanning direction of the beam incident on the second scanning lens 7 at the farthest position from the axis.

As shown in FIG. 6, the off-axis marginal ray 64 obliquely enters the second scanning lens 7. This is because the beam obliquely enters the scanning optical system in the sub-scanning section. At this time, if the beams are incident on the optical axis in the sub-scanning section, the beams are emitted in a refracted form and thus, the emitted beams enter the image plane at spatially torsional positions instead of reaching the image plane at one point. If the beam reaches the image plane in the torsional form, the beam is turned, resulting in the deformed spot.

Figure 7:
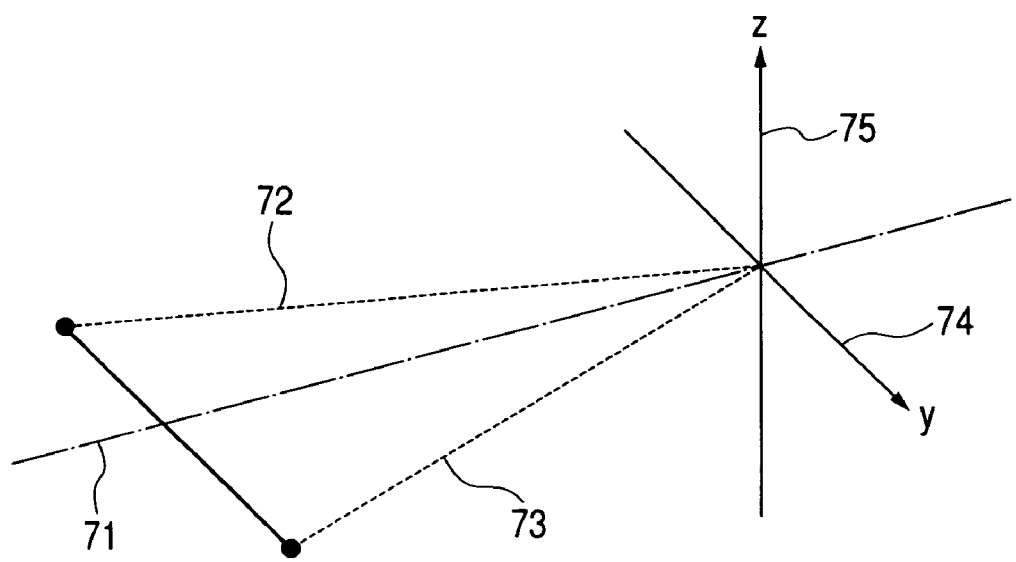
FIG. 7 illustrates conditions of marginal rays in a main scanning direction of a beam until the rays outgoing from a second scanning lens reach an image plane.

FIG. 7 illustrates conditions of the marginal rays in the main scanning direction of the beam until the rays outgoing from the second scanning lens 7 reach the image plane. In FIG. 7, reference numeral 71 denotes a principle ray of the beam; 72, 73, marginal rays in the main scanning direction, respectively; 75, a z-coordinate in the image plane in the sub scanning direction; and 74, a y-coordinate in the sub scanning direction, in the image height direction (main scanning direction).

Figure 8:
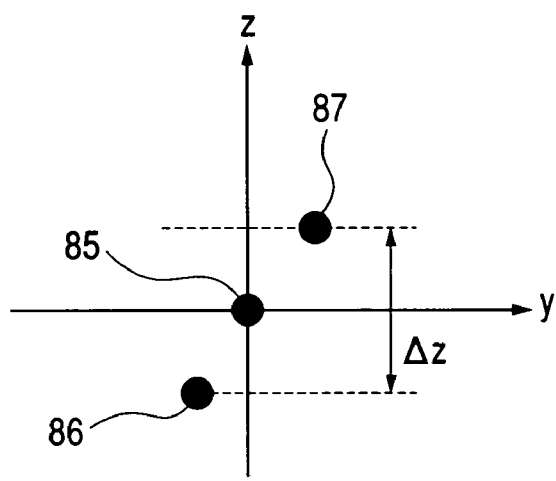
FIG. 8 illustrates positions at which the marginal rays reach the image plane as black circles.

FIG. 8 illustrates positions at which the marginal rays reach the image plane as black circles. In FIG. 8, reference numeral 85 denotes a position at which the principle ray of the beam reaches the image plane. Reference numerals 86 and 87 each denote a position at which the marginal ray in the main scanning direction reaches the image plane.

As shown in FIG. 8, unless the turning of the beam is corrected, the beam reaches the image plane out of position. At this time, when the marginal rays 86 and 87 reach there at a large deviation amount ΔZ of the beam arrival position in the Z direction, the turning amount of the spot increases, resulting in the deformed spot.

Figure 9:
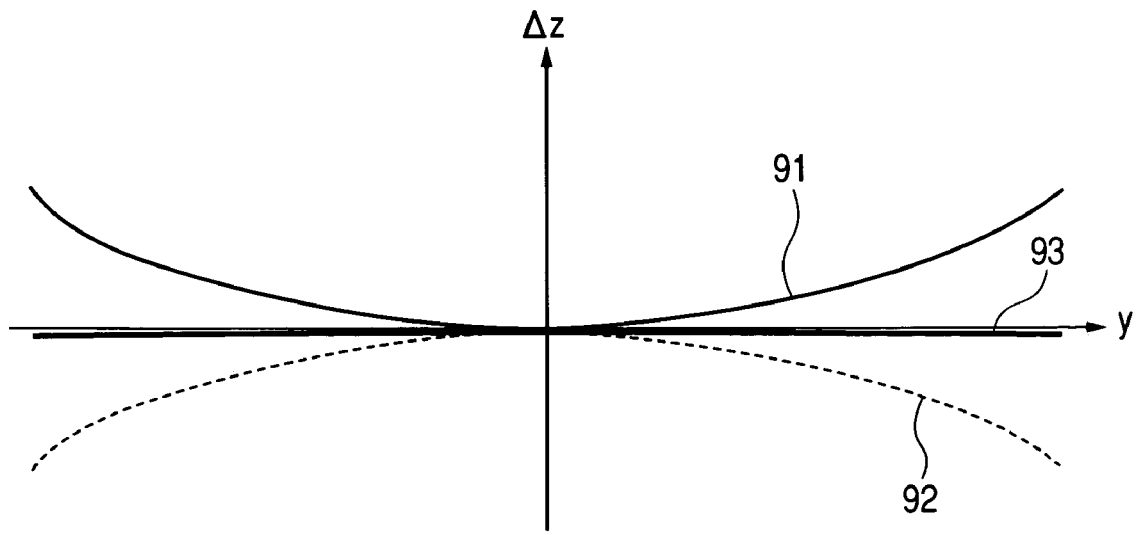
FIG. 9 is a graph representative of a decentering effect of a lens in a sub scanning direction.

FIG. 9 is a graph representative of a decentering effect of the lens (scanning lens) in the sub-scanning section. In FIG. 9, in the case of not decentering the lens in the sub-scanning section with respect to the obliquely incident beam, the deviation amount ΔZ takes a larger value as an image height y increases as denoted by 91 in the graph. Accordingly, in such a state, when the image height is 0, the beam is not turned. However, as the image height y increases, the turning amount of the beam increases; the beam is most obviously deformed with the maximum image height.

Denoted by 92 in the graph is a case of decentering the lens in the sub-scanning section under the condition that the beam is not obliquely incident, i.e., that an obliquely incident angle α is 0. As apparent from the graph, the deviation amount ΔZ is changed based on whether or not the lens is decentered. Denoted by 93 is a condition where the correction is performed such that the deviation amount ΔZ of the beam is cancelled by applying an operation of decentering the lens to the obliquely incident condition, thus avoiding the variation depending on the image height. That is, decentering the lens suppresses the turning of the beam and offers a favorable spot.

Also, as shown in FIG. 9, a direction in which the deviation amount ΔZ is cancelled is a direction in which the optical axis of an anamorphic lens (second scanning lens 7) having a positive refractive power in both the main scanning direction and the sub scanning direction is shifted toward the deflection point side with respect to the beam transmission position in the sub scanning direction.

Hereinafter, a description will be given of a principle that the scanning line curvature is caused in theory upon the oblique incidence as compared with the case of not involving the oblique incidence.

Figure 10:
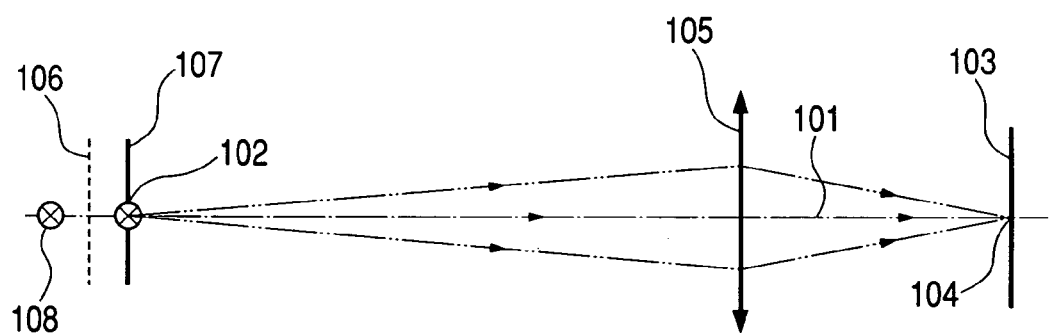
FIG. 10 illustrates a condition in a sub-scanning section with no oblique incidence.

FIG. 10 illustrates a condition in the sub-scanning section with no oblique incidence. In FIG. 10, reference numeral 101 indicates an optical axis of the scanning optical system in the sub-scanning section; 102, a position where the incident optical system temporarily focuses the beam into a linear image; 103, an image plane (photosensitive drum surface); 104, an imaging point on the image plane; 105, a scanning optical system; 106, a deflection surface of the polygon mirror at an image center; 107, a deflection surface of the polygon mirror at an image end; and 108, a mirror image position relative to the position 102 where the incident optical system temporarily focuses the beam into the linear image on the deflection surface 107 at the image center.

In FIG. 10, in the case of not involving the oblique incidence, even if the deflection surface of the polygon mirror is shifted from the one denoted by 106 to the one denoted by 107 owing to the rotation of the polygon mirror, the mirror position 108 where the beam is temporarily focused into an image at the image center is on the optical axis 101. Thus, the beam is focused into an image on the optical axis 101 even on the image plane 103. As a result, the scanning line curvature does not occur, which corresponds to the imaging position shift, in the sub-scanning section according to the image position.

Figure 11:
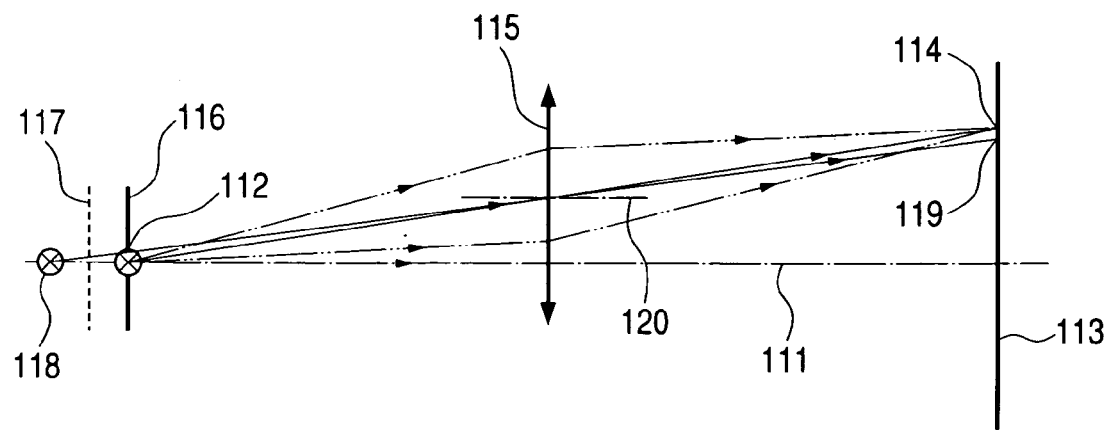
FIG. 11 illustrates a condition in a sub-scanning section in an oblique incident optical system.

FIG. 11 illustrates a condition in the sub-scanning section in an oblique incident optical system. In FIG. 11, reference numeral 111 denotes a normal to a deflection surface; 112, a position where an incident optical system temporarily focuses the beam into a linear image; 113, an image plane (photosensitive drum surface); 114, an imaging point on the image plane 113 at an image end; 115, a scanning optical system; 116, a deflection surface of a polygon mirror at the image end; 117, a deflection surface of the polygon mirror at an image center; 118, a mirror position relative to the position 112 where the incident optical system temporarily focuses the beam into a linear image on the deflection surface 117 at the image end; 119, an imaging position on the image plane at the image end without correcting a magnification; and 120, an optical axis of the scanning optical system 115.

As shown in FIG. 11, the deflection surface 116 at the image end is at the same position as the position 112 where the incident optical system temporarily focuses the beam into a linear image. On the other hand, the temporarily imaging point at the image center does not coincide with the position of the deflection surface 117 and thus serves as the imaging point in the case of emitting the beam from the mirror position 118. Thus, the beam is focused into an image at the imaging position 119 different from the imaging point at the image center with respect to the sub-scanning section. The shift of the imaging position 119 according to the image position leads to the scanning line curvature.

To correct the scanning line curvature, in this embodiment, a lens plane shape is changed according to the image position, thereby shifting a position of a principle plane to keep the magnification in the sub-scanning section constant. More specifically, an object point shift in the optical axis direction due to the rotation of the polygon mirror, which changes a field angle of the beam incident on the scanning optical system 115, is corrected by changing the lens plane; the magnification in the sub-scanning section is kept constant irrespective of the rotation angle of the polygon mirror. Therefore, the beams are focused into an image at the same imaging point on the image plane 113 in the sub-scanning section.

In the present invention, the term "constant magnification in the sub-scanning section" means that the magnification in the sub-scanning section falls within a range of ±10% or less in the entire scanning region based on the magnification in the sub-scanning section on the axis (image center) on the surface to be scanned 8.

In particular, in the case where the common polygon mirror is used for scanning with the beam on the photosensitive drum surfaces at both sides of the polygon mirror, the scanning line curvature occurs in an opposing direction unless the number of folding mirrors is changed. In this case, the images formed on the photosensitive drum surfaces arranged at both sides are finally superposed into a multi-color image. At this time, the scanning position shift leads to the color drift and color tint variation, resulting in the deteriorated image. However, it is experimentally found that a difference in the beam arrival position between the image center and the image end is suppressed to a level corresponding to one pixel or smaller, so that the above shift is regarded as allowable in terms of the image quality.

Also, with the structure of this embodiment, the scanning line curvature can be corrected to an allowable level as described above. By definition, the small magnification in the sub-scanning section of the optical scanning system, in particular, the magnification less than 0.7-fold magnification causes less scanning line curvature in principle, which level is insignificant even if this embodiment is not applied.

Effects of this embodiment are most significantly exerted on the scanning optical system having the 0.7-fold or higher magnification in the sub-scanning section. Further, to correct the curvature of field in the sub-scanning section, a refractive power of a scanning lens in the sub-scanning section should weaken from the on-axis position to the off-axis position.

Accordingly, in this embodiment, the imaging magnification in the sub-scanning section for the scanning optical system 9 is set to the 0.7-fold or higher magnification in the entire surface to be scanned 8 and as described above, the second scanning lens 17 is formed such that its refractive power weakens from the on-axis position to the off-axis position.

As described above, in this embodiment, the beam from the cylindrical lens (condenser lens) 4 is made incident at an angle with the normal to the deflection surface 5a in the sub-scanning section to set the imaging magnification substantially constant in the sub-scanning section of the scanning optical system 9. As a result, the optical scanning apparatus capable of attaining the favorable spot shape on the surface to be scanned and free of the scanning line curvature can be obtained.

Note that in this embodiment, the light source means is constituted of a single beam laser. However, the present invention is not limited thereto but may adopt the one constituted of a multi-beam laser having plural light emitting points where the plural beams are emitted. Thus, the same surface to be scanned may be scanned with the plural emitted beams through the common light deflector.

(Numerical Embodiment)

Figure 12:
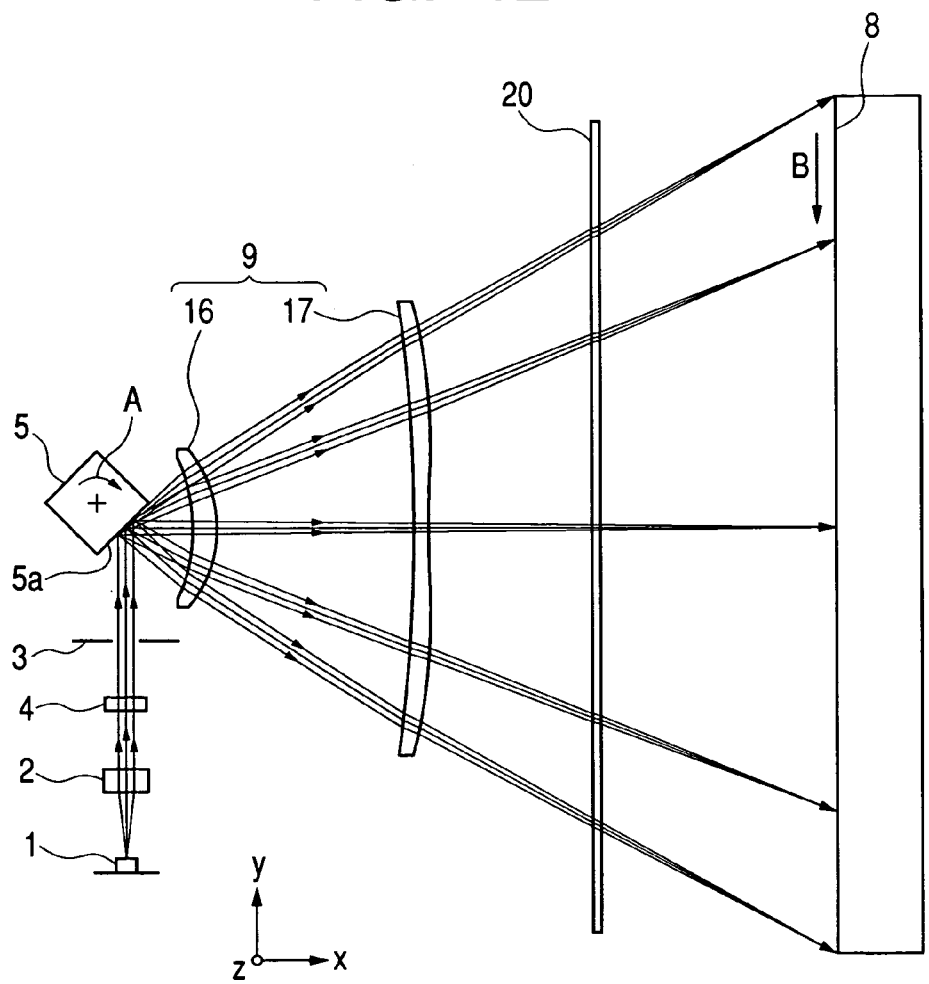
FIG. 12 is a main-scanning sectional view of an optical scanning apparatus according to a numerical embodiment of the present invention.
Figure 13:
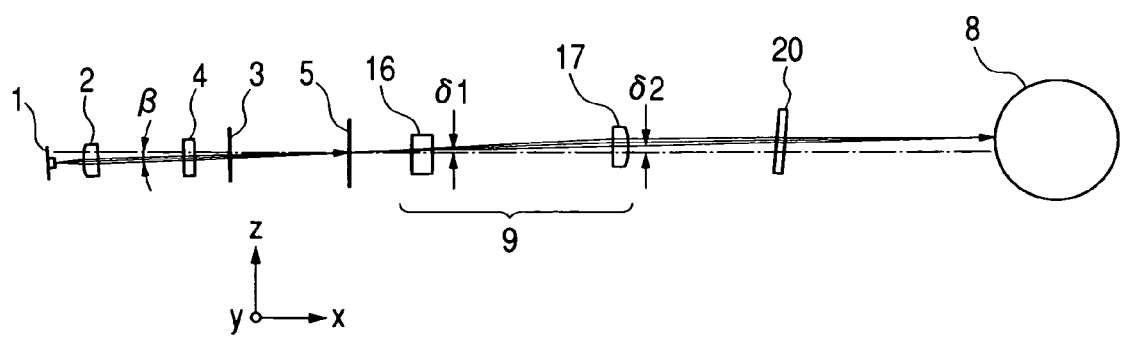
FIG. 13 is a sub-scanning sectional view of the optical scanning apparatus according to the numerical embodiment of the present invention.

Hereinafter, a numerical embodiment of the present invention will be described. Table 1 shows optical parameters of the present invention. FIGS. 12 and 13 are a main-scanning sectional view and a sub-scanning sectional view of an optical scanning apparatus according to the numerical embodiment, respectively. In FIGS. 12 and 13, the same components as in FIGS. 1 and 2 are denoted by the same reference symbols.

The shapes of refraction surfaces of the first scanning lens 16 and the second scanning lens 17 of the numerical embodiment are represented by the following shape expression. That is, provided that a point where the lens plane crosses the optical axis is set as the origin; an x axis represents an optical axis direction; a y axis represents an axis orthogonal to the optical axis in the main-scanning section; and a z axis represents an axis orthogonal to the optical axis in the sub-scanning section, a generatrix direction corresponding to the main scanning direction is represented by the following expression:

$$x = \frac{y^2/R}{1+\sqrt{1-(1+K)(y/R)^2}} + B_4 y^4 + B_6 y^6 + B_8 y^8 + B_{10} y^{10}$$

(where R represents a radius of curvature, and K, $B_4$, $B_6$, $B_8$, and $B_{10}$ each represent an aspherical coefficient), and the meridian direction corresponding to the sub scanning direction (direction orthogonal to the main scanning direction including the optical axis) is represented by the following expression:

$$x = \frac{z^2/r'}{1+\sqrt{1-(1+K)(z/r')^2}}$$

$$r' = r(1 + D_2 y^2 + D_4 y^4 + D_6 y^6 + D_8 y^8 + D_{10} y^{10})$$

(where r' represents a meridian radius of curvature on the optical axis, and $D_2$, $D_4$, $D_6$, $D_8$, and $D_{10}$ each represent an aspherical coefficient), and the unit of r, R, and d is mm.

TABLE 1

| | |
|---|---|
| Wavelength used (mm) | 7.90E−07 |
| Refractive index of fθ lens | 1.524 |
| Incident angle in main scanning direction (deg.) | 90 |
| Incident angle in sub scanning direction (deg.) | 2.2 |
| Deflection point-G1R1 (mm) | 1.65E+01 |
| Focal distance of fθ lens (mm) | 1.50E+02 |

| | | R1 plane | | R2 plane | |
|---|---|---|---|---|---|
| Type ST2 | | Scanning starting-side (s) | Scanning ending-side (e) | Scanning starting-side (s) | Scanning ending-side (e) |
| Main scanning | d | 6.00E+00 | | d | 4.80E+01 |
| | R | −3.62E+01 | | R | −2.48E+01 |
| | K | −1.18E+00 | K −1.18E+00 | K | −2.26E+00 K −2.26E+00 |
| | B4 | 5.67E−06 | B4 5.67E−06 | B4 | −1.05E−05 B4 −1.05E−05 |
| | B6 | 2.76E−08 | B6 2.76E−08 | B6 | 2.55E−08 B6 2.55E−08 |
| | B8 | −1.31E−10 | B8 −1.31E−10 | B8 | −1.84E−11 B8 −1.84E−11 |
| | B10 | 1.13E−13 | B10 1.13E−13 | B10 | −5.89E−14 B10 −5.89E−14 |
| Sub scanning | r | −1.00E+03 | r | r | −1.00E+03 r |
| | D2 | 0.00E+00 | D2 0.00E+00 | D2 | 0.00E+00 D2 0.00E+00 |
| | D4 | 0.00E+00 | D4 0.00E+00 | D4 | 0.00E+00 D4 0.00E+00 |
| | D6 | 0.00E+00 | D6 0.00E+00 | D6 | 0.00E+00 D6 0.00E+00 |
| | D8 | 0.00E+00 | D8 0.00E+00 | D8 | 0.00E+00 D8 0.00E+00 |
| | D10 | 0.00E+00 | D10 0.00E+00 | D10 | 0.00E+00 D10 0.00E+00 |

| | | R3 plane | | R4 plane | |
|---|---|---|---|---|---|
| Type ST2 | | Scanning starting-side (s) | Scanning ending-side (e) | Scanning starting-side (s) | Scanning ending-side (e) |
| Main scanning | d | 4.00E+00 | | d | 9.95E+01 |
| | R | −4.61E+02 | | R | 8.36E+02 |
| | K | 0.00E+00 | K 0.00E+00 | K | −3.58E+01 K −3.58E+01 |
| | B4 | 0.00E+00 | B4 0.00E+00 | B4 | −1.02E−06 B4 −1.02E−06 |
| | B6 | 0.00E+00 | B6 0.00E+00 | B6 | 2.09E−10 B6 20.9E−10 |
| | B8 | 0.00E+00 | B8 0.00E+00 | B8 | −3.39E−14 B8 −3.39E−14 |
| | B10 | 0.00E+00 | B10 0.00E+00 | B10 | 2.68E−18 B10 2.68E−18 |
| Sub scanning | r | −1.00E+03 | r | r | −2.14E+01 r |
| | D2 | 0.00E+00 | D2 0.00E+00 | D2 | 1.81E−04 D2 1.69E−04 |
| | D4 | 0.00E+00 | D4 0.00E+00 | D4 | −8.03E−08 D4 −6.92E−08 |
| | D6 | 0.00E+00 | D6 0.00E+00 | D6 | 3.07E−11 D6 2.19E−11 |
| | D8 | 0.00E+00 | D8 0.00E+00 | D8 | −7.61E−15 D8 −4.14E−15 |
| | D10 | 0.00E+00 | D10 0.00E+00 | D10 | 8.89E−19 D10 3.78E−19 |

Figure 14A:
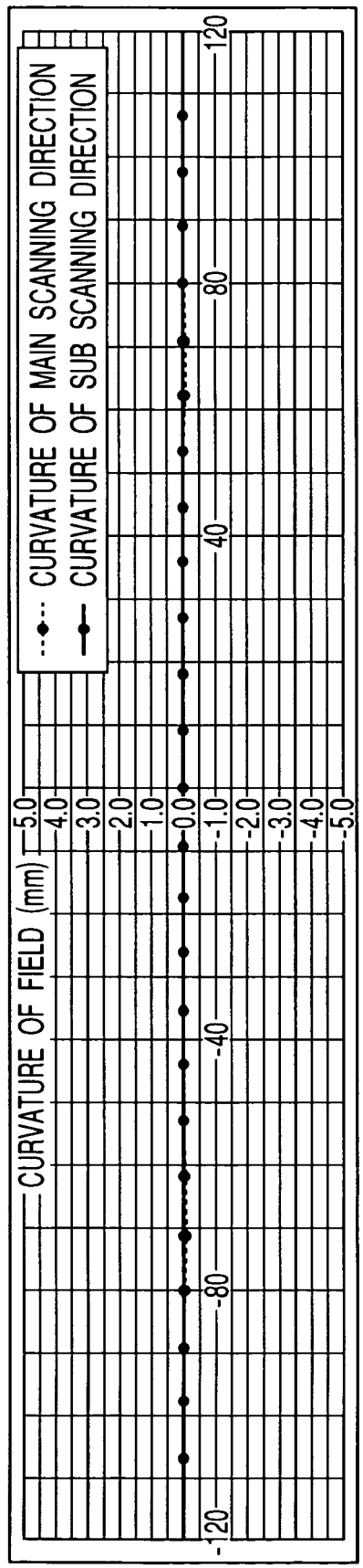
FIGS. 14A and 14B each illustrate an optical performance according to the numerical embodiment of the present invention.
Figure 14B:
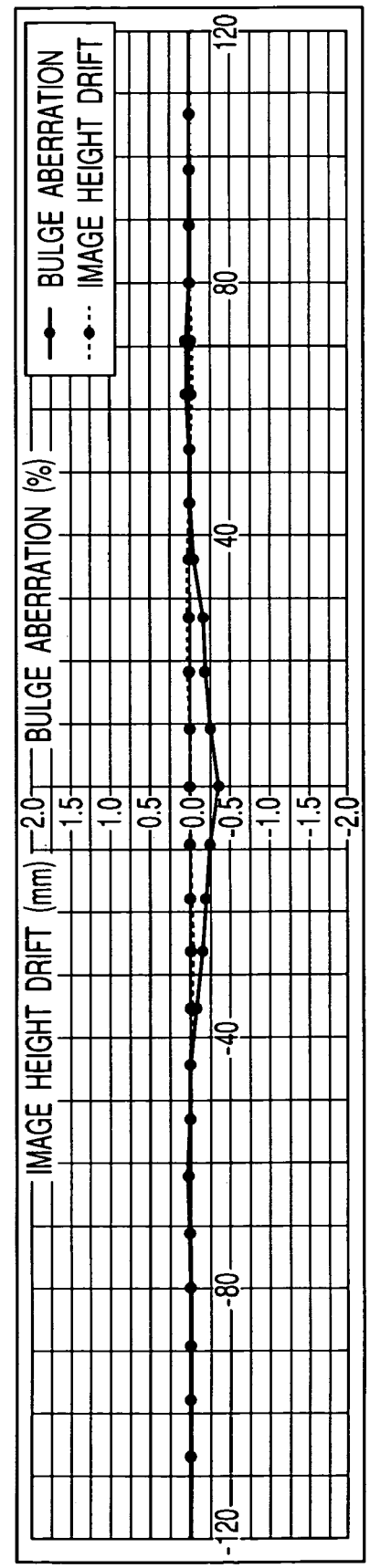

In this embodiment, the beam is incident at an obliquely incident angle of 2.2 degrees with the normal to the deflection surface 5a of the polygon mirror 5 (oblique incident optical system). Also, in this case, the second scanning lens 17 has the optical axis at a position shifted by 1.46 (mm) in the z direction (sub scanning direction) with respect to the plane perpendicular to the deflection point. FIGS. 14A and 14B each show a paraxial image plane position at this point. As shown in FIGS. 14A and 14B, the satisfactory optical performance can be attained in terms of the imaging performance and the image height drift.

Here, with the proviso that the resolution is 600 dpi, the respective parameters in Conditional Expression (1) above in this embodiment are as follows.

$\beta max=1.384$
$\beta min=1.377$
$P=0.0423$ (mm)
$\Delta L=1.46$ (mm)

Those values meet Conditional Expression (1).

Also, the optical axis of the second scanning lens 17 is shifted by 1.3 (mm) toward the deflection point side with respect to the incident beam. Therefore, the turning of the beam is corrected, achieving the satisfactory spot shape. Further, the optical axis is shifted to the deflection point side, by which the magnification can be set more uniformly in the sub-scanning section while the scanning line curvature can be corrected. In this embodiment, the scanning line curvature is suppressed to 2 $\mu$m or less to obtain the satisfactory optical performance.

In this embodiment, the case of using the resolution of 600 dpi has been described by way of example. However, the present invention rather exerts the effects on the image forming apparatus having the resolution of 1200 dpi or more, which value exceeds 600 dpi.

In this embodiment, the optical axis of the second scanning lens 17 is shifted to the deflection point side with respect to the incident beam. However, it is possible to shift the optical axis to the deflection point side and to decenter (tilt) it through the rotation about the main scanning direction as an axis.

(Second Embodiment)

Figure 15:
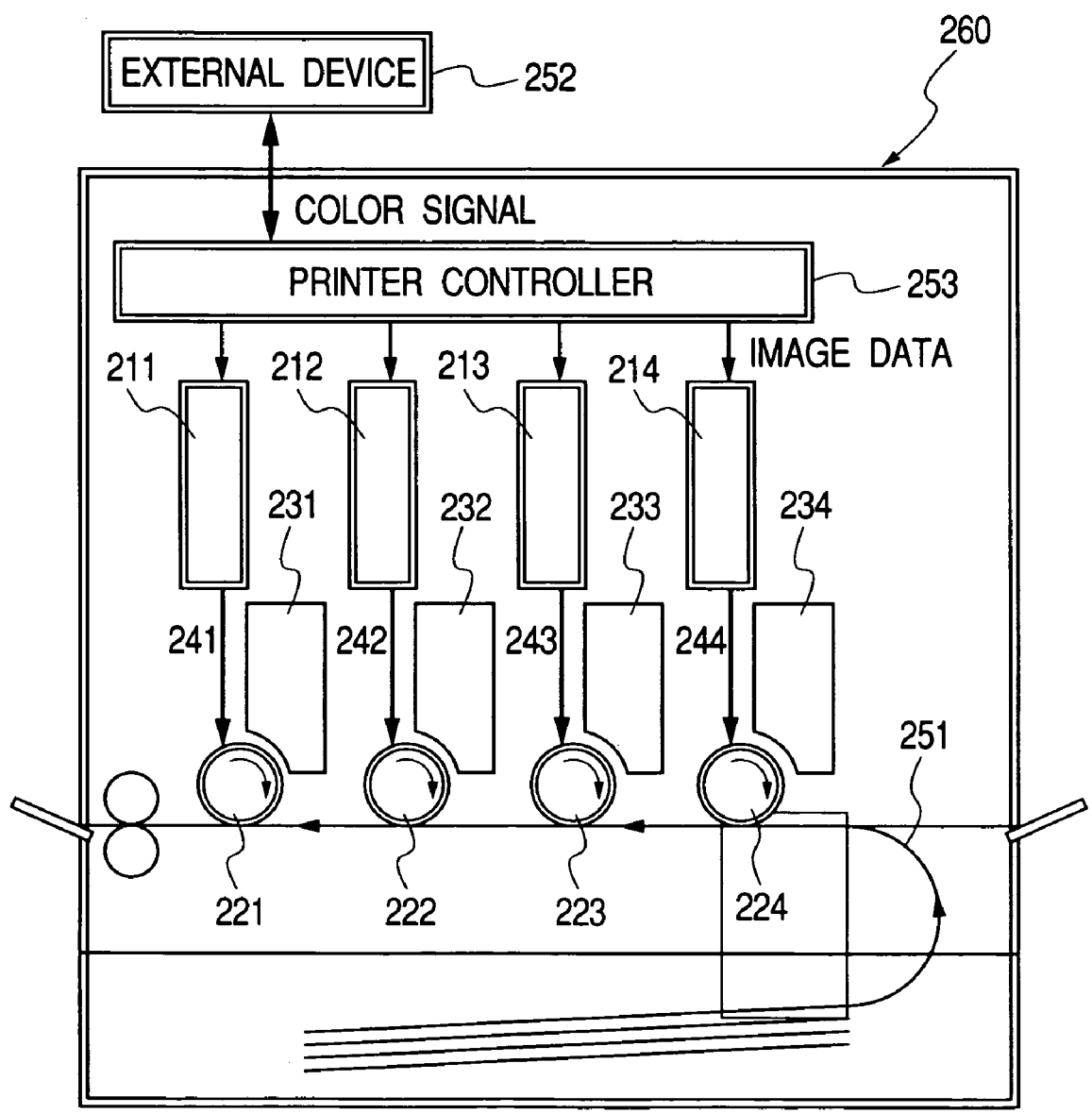
FIG. 15 is a schematic diagram showing a main part of a color image forming apparatus according to a second embodiment of the present invention.

FIG. 15 is a schematic diagram showing a main part of a color image forming apparatus according to a second embodiment of the present invention. This embodiment corresponds to a tandem type color image forming apparatus where the four optical scanning apparatuses according to the first embodiment are arranged and used for recording image information on a photosensitive drum surface as an image bearing member surface in parallel.

In FIG. 15, reference numeral 260 denotes a color image forming apparatus. Denoted by 211, 212, 213, and 214 are each an optical scanning apparatus according to the first embodiment. Denoted by 221, 222, 223, and 224 are each a photosensitive drum as the image bearing member. Denoted by 231, 232, 233, and 234 are each a developing device. Denoted by 251 is a conveyor belt.

In FIG. 15, the color image forming apparatus 260 receives signals in respective colors of R (red), G (green), and blue (B) from an external device 252 such as a personal computer. Those color signals are converted by a printer controller 253 within the apparatus into image data (dot data) in respective colors of C (cyan), M (magenta), Y (yellow), and B (black) to be inputted to the optical scanning apparatuses 211, 212, 213, and 214, respectively. Light beams 241, 242, 243, and 244 are emitted from the optical scanning apparatuses after being modulated according to the corresponding image data to scan photosensitive surfaces of the photosensitive drums 221, 222, 223, and 224 with the light beams in the main scanning direction.

The color image forming apparatus according to an aspect of this embodiment has the four optical scanning apparatuses (211, 212, 213, and 214) arranged and corresponding to the respective colors of C (cyan), M (magenta), Y (yellow), and B (black). The optical scanning apparatuses are adopted to record image signals (image information) on the surfaces of the photosensitive drums 221, 222, 223, and 224, in parallel to one another, thereby printing the color image at a high speed.

The color image forming apparatus according to the aspect of this embodiment forms latent images in respective colors on the corresponding surfaces of the photosensitive drums 221, 222, 223, and 224 with the light beam based on the image data using the four optical scanning apparatuses 211, 212, 213, and 214 as described above. Thereafter, the latent images are multiply transferred onto the recording material to form a single full-color image.

The external device 252 may be a color image reading apparatus equipped with a CCD sensor, for instance. In this case, the color image reading apparatus and the color image forming apparatus 260 constitute a color digital copying machine.

(Third Embodiment)

Figure 16:
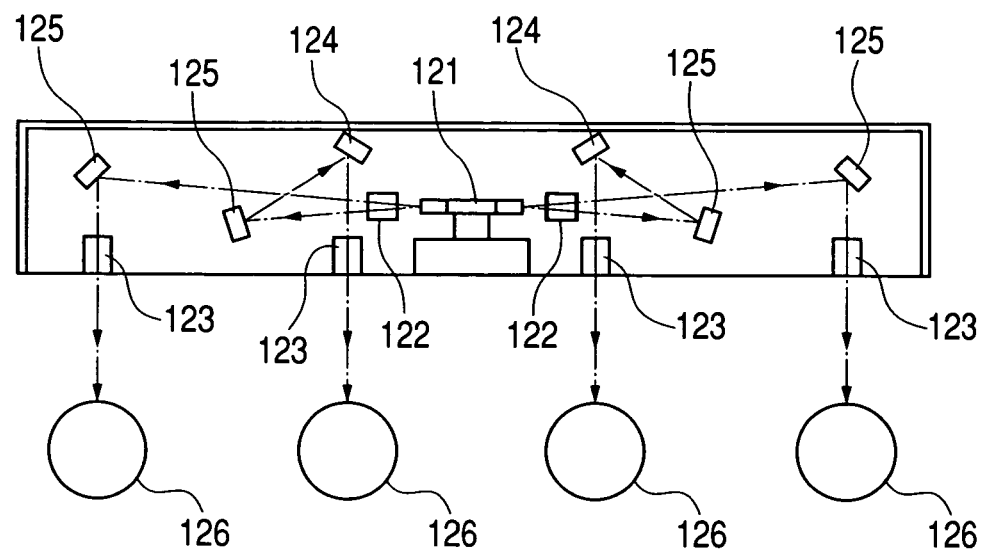
FIG. 16 is a schematic diagram showing a main part of a third embodiment of the present invention.

FIG. 16 is a schematic diagram showing a main part of a third embodiment of the present invention.

This embodiment corresponds to an image forming apparatus where different photosensitive drums 126 are scanned using a single polygon mirror 121 to form a full-color image through the multi-development.

More specifically, in FIG. 16, reference numeral 121 denotes a single light deflector, which is constituted of the (rotary) polygon mirror, for instance, and rotated at a constant speed by drive means (not shown) such as a motor. Denoted by 122 are first scanning lenses each serving as a first imaging means and constituted of an anamorphic lens having a refractive power mainly in the main-scanning section, on which two or more beams are incident. Denoted by 123 are second scanning lenses each serving as a second imaging means and constituted of an anamorphic lens having a refractive power mainly in the sub-scanning section, on which the corresponding beams are incident.

Reference numerals 124 and 125 denote first folding mirrors and second folding mirrors, respectively, all of which reflect the beam toward the predetermined direction; and 126, the photosensitive drums each obtained by coating a conductor with a photosensitive layer, on which the electrostatic latent images are formed with the corresponding beams.

In this embodiment, the first scanning lenses 122, the second scanning lenses 123, the first folding mirrors 124, and the second folding mirrors 125 constitute the scanning optical system. The scanning optical systems are arranged at both sides of the single polygon mirror 121. The scanning optical system has almost the same optical performance as that of the above first embodiment.

In this embodiment, the four beams emitted from the incident optical system (not shown) including light source means (not shown) and plural cylindrical lenses (not shown) are incident at different angles with the normal to the deflection surface of the single polygon mirror 121 from the different directions in the sub-scanning section, and temporarily focused into an image in the vicinity of the deflection surface (oblique incident optical system). The light source means emits the plural (in this embodiment, four) beams modulated according to the image signal. The cylindrical lenses each have a refractive power only in the sub scanning direction as condenser lenses arranged corresponding to the four beams.

Here, in this embodiment, the light source means is constituted of two monolithic semiconductor lasers each having two light emitting portions.

However, the present invention is not limited thereto but may adopt the light source means constituted of four monolithic semiconductor lasers each having one light emitting portion.

Also, in this embodiment, the four beams enter the four photosensitive drums 126 in a one-to-one relationship to form a scanning line on each photosensitive drum 126. However, the present invention is not limited thereto.

In the present invention, two or more beams may be incident on each of the four photosensitive drums 126 to form the scanning line on each photosensitive drum 126.

In this case, a surface emitting laser having two or more light emitting portions may be used.

After that, the four temporarily focused beams are deflected and reflected through the rotation of the polygon mirror 121 to enter each of the scanning optical systems arranged at both sides of the single polygon mirror 121. In the optical scanning system, the two beams are incident on the common first scanning lens 122 at different angles at each side and are refracted mainly in the sub-scanning section, correcting the curvature of field in the main-scanning section and the fθ characteristic. Further, the beams emitted from the first scanning lens 122 are each incident on the corresponding second scanning lens 123 through the corresponding folding mirror with the curvature of field corrected mainly in the sub-scanning section, and are focused into an spot image on the corresponding photosensitive drum 126 surface to be scanned thereon.

As shown in FIG. 16, the polygon mirror 121 is used singly while the first scanning lens 122 is common to the plural beams, making it possible to reduce the optical parts. Also, adopting the oblique incident optical system minimizes a width of the first scanning lens 122 and the polygon mirror 121 in the sub scanning direction. Thus, the color image forming apparatus can be provided with a simple structure using the four beams.

Figure 17:
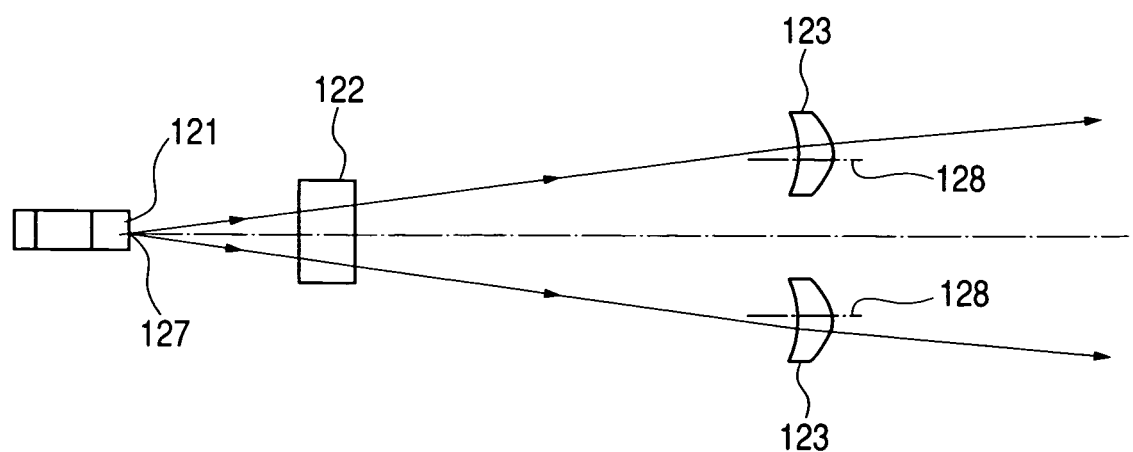
FIG. 17 is a developed view showing a condition of an optical path of one optical scanning system in a developed form.

FIG. 17 is a developed view showing a condition of an optical path of the optical scanning systems at one side of the polygon mirror 121 in a developed form excluding the folding mirror. In FIG. 17, the same components as in FIG. 16 are denoted by the same reference numerals.

As shown in FIG. 17, the second scanning lenses 123 each include an optical axis 128 at a position eccentric to a deflection and reflection point 127 side in the sub-scanning section. At this time, by setting the magnification constant in the sub-scanning section while meeting Conditional Expression (1) above, the scanning line curvature is eliminated as well as the turning of the beam can be corrected. Accordingly, the photosensitive drum 126 surface can be optically scanned with the favorable beam spot with a scanning path involving the less scanning line curvature.

As described above, in this embodiment, the plural beams from the incident optical system are made incident with an angle with the normal to the deflection surface of the single polygon mirror 121 in the sub-scanning section. The imaging magnification is set substantially constant in the sub-scanning section in the plural scanning optical systems. As a result, the color image forming apparatus capable of attaining the satisfactory spot shape on the surface to be scanned and free of the scanning line curvature can be obtained.

In this embodiment, the optical axes of the two second scanning lenses 123 are shifted to the deflection point side with respect to the incident beam. However, it is possible to shift the optical axis of at least one of the two second scanning lenses 123 to the deflection point side and to decenter (tilt) it through the rotation about the main scanning direction as an axis.

(Fourth Embodiment)

Figure 18:
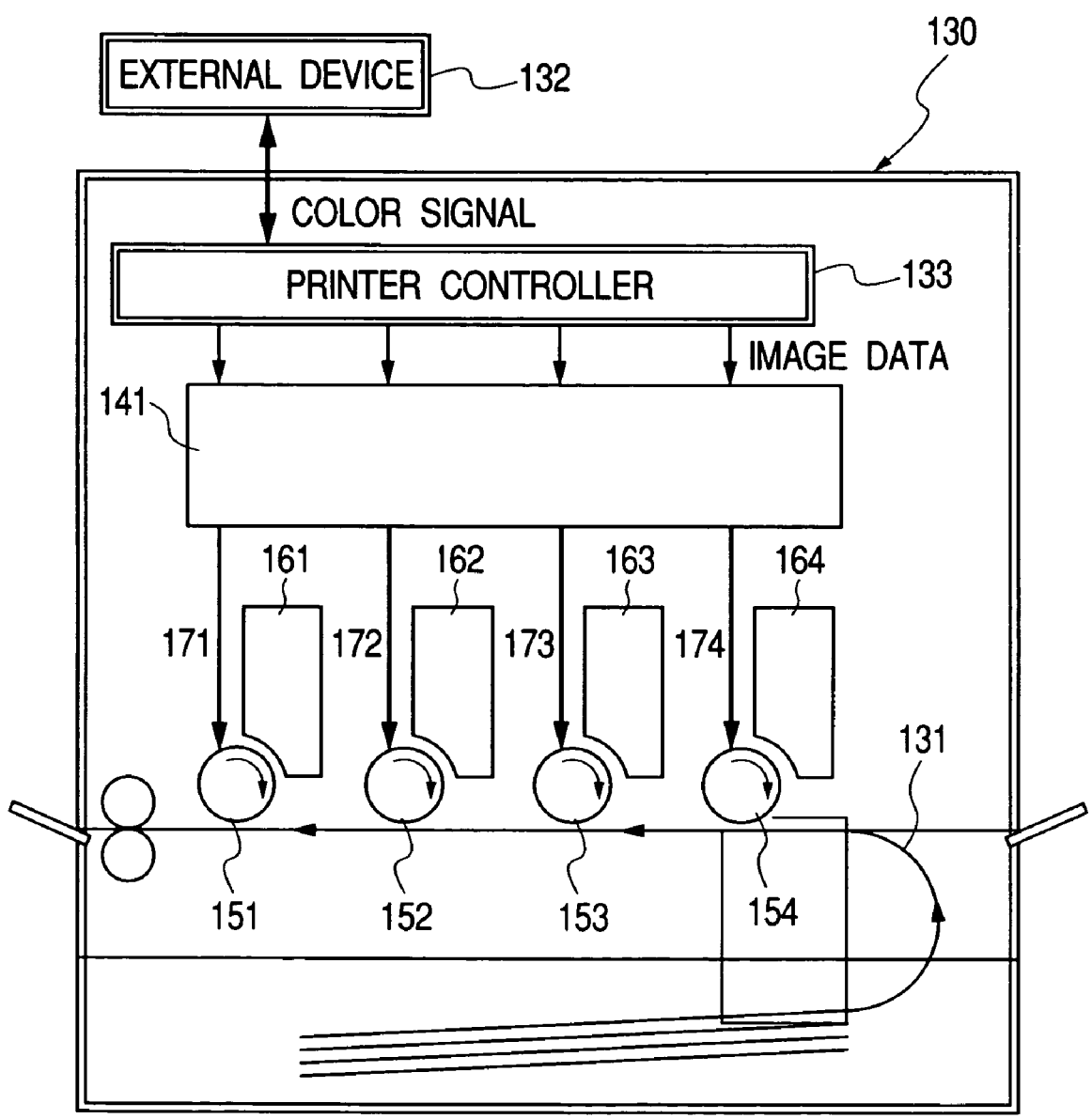
FIG. 18 is a schematic diagram showing a main part of a color image forming apparatus according to a fourth embodiment of the present invention.
Figure 19:
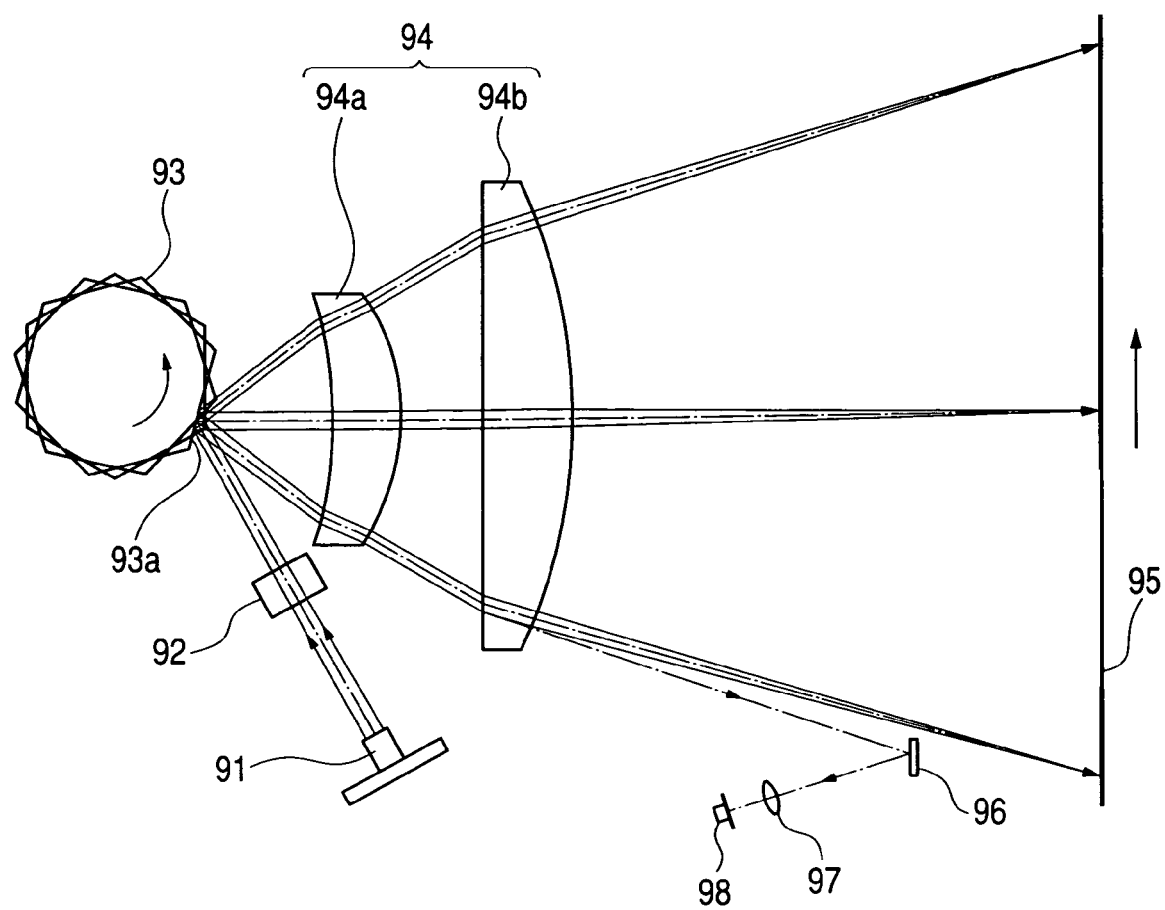
FIG. 19 is a main-scanning sectional view of an optical scanning apparatus used in a conventional image forming apparatus.

FIG. 18 is a schematic diagram showing a main part of a color image forming apparatus according to a fourth embodiment of the present invention.

This embodiment corresponds to a tandem type color image forming apparatus in which the image forming apparatus according to the third embodiment is used for scanning with four beams for recording image information on a photosensitive member as an image bearing member in parallel to one another.

In FIG. 18, reference numeral 130 denotes a color image forming apparatus; and 141, an optical scanning apparatus having the structure according to the third embodiment. Denoted by 151, 152, 153, and 154 are each a photosensitive drum as the image bearing member. Denoted by 161, 162, 163, and 164 are each a developing device. Denoted by 131 is a conveyor belt.

In FIG. 18, the color image forming apparatus 130 receives signals in respective colors of R (red), G (green), and blue (B) from an external device 132 such as a personal computer. Those color signals are converted by a printer controller 133 within the apparatus into image data (dot data) in respective colors of C (cyan), M (magenta), Y (yellow), and B (black) to be inputted to the optical scanning apparatus 141. Light beams 171, 172, 173, and 174 are emitted from the optical scanning apparatus 141 after being modulated according to the corresponding image data to scan photosensitive surfaces of the photosensitive drums 151, 152, 153, and 154 with the light beams in the main scanning direction.

The color image forming apparatus according to another aspect of this embodiment has the optical scanning apparatus 141 which conducts scanning with the four beams corresponding to the respective colors of C (cyan), M (magenta), Y (yellow), and B (black). The beams are used to record the image signals (image information) on the surfaces of the photosensitive drums 151, 152, 153, and 154, in parallel to one another, thereby printing the color image at a high speed.

The color image forming apparatus according to the aspect of this embodiment form latent images in respective colors on the corresponding surfaces of the photosensitive drums 151, 152, 153, and 154 with the beams based on the corresponding image data using the optical scanning apparatus 141. Thereafter, the latent images are multiply transferred onto the recording material to form a single full-color image.

The external device 132 may be a color image reading apparatus equipped with a CCD sensor, for instance. In this case, the color image reading apparatus and the color image forming apparatus 130 constitute a color digital copying machine.

Hereinabove, the various examples and embodiments of the present invention have been described. However, it will be understood by those skilled in the art that the gist and the scope of the present invention should not be construed as being limited to the specific description in this specification or the accompanying drawings. The present invention allows various modifications and alterations within the scope of the appended claims.

According to the present invention, as set forth, the beam from the condenser lens is incident at an angle with the normal to the deflection surface in the sub-scanning section and the optical axis of the scanning optical element is eccentric to the deflection point side of the deflection surface with respect to the transmission position of the principal ray of the beam in the sub scanning direction, whereby the optical scanning apparatus capable of attaining the satisfactory spot shape on the surface to be scanned and free of the scanning line curvature can be provided.

What is claimed is:

1. An optical scanning apparatus, comprising:
   light source means;
   an incident optical system for temporarily focusing a beam emitted from the light source means in a sub-scanning section to form a linear image on a deflection surface of a light deflector; and
   a scanning optical system for guiding the beam deflected by the light deflector onto a surface to be scanned,
   wherein the beam from the incident optical system is incident at an angle with a normal to the deflection surface in the sub-scanning section;
   wherein the imaging magnification in the sub-scanning section of the scanning optical system is 0.7-fold or higher magnification in the entire scanning region and the scanning optical system includes a first scanning optical element having a refractive power in a main-scanning section and a second scanning optical element having a refractive power in the sub-scanning section, which weakens from an on-axis position to an off-axis position; and
   wherein an optical axis of the scanning optical element is eccentric toward a deflection point side of the deflection surface with respect to a transmission position of a principal ray of the beam in a sub scanning direction to meet the following expression:

$(\beta max - \beta min) < P/\Delta L$ where βmax represents a maximum value of an imaging magnification in the sub-scanning section of an entire scanning region of the scanning optical system and βmin represents a minimum value of the imaging magnification in the sub-scanning section of the entire scanning region of the scanning optical system; P represents a pixel size defined according to a resolution in the sub-scanning section; and ΔL represents a distance between the normal to the deflection surface at the deflection point and the optical axis of the scanning optical element in the sub scanning direction.

2. An optical scanning apparatus according to claim 1, wherein the imaging magnification in the sub-scanning section of the scanning optical system is substantially constant within a range of ±10% or less in the entire scanning region.

3. An optical scanning apparatus according to claim 1, wherein in the sub-scanning section, the principal ray of the beam incident on the second scanning optical element enters the second scanning optical element at an angle with an optical axis thereof and the optical axis of the second scanning optical element extends in parallel to the normal to the deflection surface.

4. A color image forming apparatus comprising an image bearing member arranged on a surface to be scanned of the optical scanning apparatus according to claim 1 and adapted to form an image.

5. A color image forming apparatus according to claim 4, further comprising a printer controller that converts data signals inputted from an external device into image data and inputs the image data to the optical scanning apparatus.

6. A color image forming apparatus comprising a plurality of image bearing members each arranged on a surface to be scanned of the optical scanning apparatus according to claim 1 and adapted to form images in colors different from one another.

7. A color image forming apparatus according to claim 6, further comprising a printer controller that converts color signals inputted from an external device into image data in different colors and inputs the image data to each optical scanning apparatus.

8. An optical scanning apparatus, comprising:
   light source means for emitting a plurality of beams;
   a plurality of incident optical systems each for temporarily focusing a beam emitted from the light source means in a sub-scanning section to form a linear image on a deflection surface of a light deflector; and
   a plurality of scanning optical systems each for guiding a beam deflected by the light deflector onto a surface to be scanned,
   wherein the imaging magnification in the sub-scanning section of the plurality of scanning optical systems is 0.7-fold or higher magnification in the entire scanning region and the plurality of scanning optical systems each include a first scanning optical element having a refractive power in a main-scanning section and a second scanning optical element having a refractive power in the sub-scanning section, which weakens from an on-axis position to an off-axis position;
   wherein the plurality of beams incident on the light deflector are incident at an angle with a normal to the deflection surface in the sub-scanning section; and
   wherein each of an optical axis of the scanning optical elements of the plurality of scanning optical systems are eccentric toward a deflection point side of the deflection surface with respect to a transmission position of a principal ray of each of the plurality of beams in a sub scanning direction to meet the following expression:

$(\beta max - \beta min) < P/\Delta L$ where P represents a pixel size defined according to a resolution in the sub-scanning section; βmax represents a maximum value of a magnification in the sub-scanning section of an entire scanning region of the plurality of scanning optical systems and βmin represents a minimum value of the magnification in the sub-scanning section of the entire scanning region of the plurality of scanning optical systems; and ΔL represents a distance between the normal to the deflection surface at the deflection point and the optical axis of the scanning optical element in the sub scanning direction.

9. An optical scanning apparatus according to claim 8, wherein the imaging magnification in the sub-scanning section of the plurality of scanning optical systems is substantially constant within a range of ±10% or less in the entire scanning region.

10. An optical scanning apparatus according to claim 8, wherein in the sub-scanning section, the principal ray of the beam incident on the second scanning optical element enters the second scanning optical element at an angle with an optical axis thereof and the optical axis of the second scanning optical element extends in parallel to the normal to the deflection surface.

11. An optical scanning apparatus, in which a deflection surface of a light deflector and a surface to be scanned are conjugate in a sub-scanning section, comprising:

light source means;

an incident optical system for guiding a beam emitted from the light source means to the deflection surface of the light deflector; and a scanning optical system for guiding the beam deflected by the light deflector onto the surface to be scanned, wherein the beam to be incident on the deflection surface of the light deflector is incident on the deflection surface at an angle with respect to a normal to the deflection surface in the sub-scanning section;

wherein scanning optical elements constituting the scanning optical system are all refractive scanning optical elements, the scanning optical system includes at least one scanning optical element having optical power in a sub-scanning direction, and an imaging magnification in the sub-scanning section of the scanning optical system is not less than 0.7-fold in an entire scanning region; and wherein a surface vertex of the incident surface of the scanning optical element having optical power in the sub-scanning direction is decentered in the sub-scanning section toward a deflection point side of the deflection surface with respect to a transmission position of a principal ray of the beam so as to satisfy the following conditional expression, $$(\beta_{max}-\Delta_{min})<P/\Delta L,$$

where $\beta_{max}$ and $\beta_{min}$ represent a maximum value and a minimum value of the imaging magnification in the sub-scanning section in the entire scanning region of the scanning optical system, respectively, P represents a pixel size defined according to a resolution in the sub-scanning section, and $\Delta L$ represents a distance in the sub-scanning direction between the deflection point of the deflection surface and the surface vertex of the incident surface of the scanning optical element having an optical power in the sub-scanning direction.

12. An optical scanning apparatus according to claim 11, wherein the transmission-type scanning optical element is a scanning lens.

13. An optical scanning apparatus according to claim 11, wherein the scanning optical system further comprises a refractive scanning optical element having optical power in the main scanning direction, and wherein the scanning optical element having optical power in the sub-scanning direction gradually weakens from an on-axis position toward an off-axis position.

14. An optical scanning apparatus according to claim 13, wherein the principal ray of the beam to be incident on the scanning optical element having optical power in the sub-scanning direction is incident thereon at an angle with respect to an optical axis thereof, and the optical axis thereof is decentered in parallel to a normal to the deflection surface.

15. An optical scanning apparatus according to claim 13, wherein an optical axis of the scanning optical element having optical power in the sub-scanning direction is decentered rotationally.

16. An optical scanning apparatus according to claim 11, wherein the light source means includes a plurality of emitting portions.

17. An image forming apparatus, comprising a photosensitive drum for forming an image, the photosensitive drum disposed on the surface to be scanned of an optical scanning apparatus according to claim 11.

18. An image forming apparatus according to claim 17, further comprising a printer controller that converts data signals inputted from an external device to image data and inputs the image data to the optical scanning apparatus.

19. An optical scanning apparatus, comprising:

a light deflector; and a plurality of scanning optical systems each for guiding a beam deflected by a deflection surface of a light deflector onto a surface to be scanned, in which the deflection surface of the light deflector and the surface to be scanned are conjugate in a sub-scanning section, wherein the beam to be incident on the deflection surface of the light deflector is incident on the deflection surface at an angle with respect to a normal to the deflection surface in the sub-scanning section;

wherein scanning optical elements constituting the plurality of scanning optical systems are all refractive scanning optical elements, the plurality of scanning optical systems each include at least one scanning optical element having an optical power in a sub-scanning direction, and an imaging magnification in the sub-scanning sections of each of the plurality of scanning optical systems is not less than 0.7-fold in respective entire scanning regions; and wherein, in each of the plurality of the scanning optical systems, a surface vertex of the incident surface of the scanning optical element having optical power in the sub-scanning direction is decentered in the sub-scanning section toward a deflection point side of the deflection surface with respect to a transmission position of a principal ray of the beam so as to satisfy the following conditional expression, $$(\beta_{max}-\Delta_{min})<P/\Delta L,$$

where $\beta_{max}$ and $\beta_{min}$ represent a maximum value and a minimum value of the imaging magnification in the sub-scanning section in the entire scanning region of the scanning optical system, respectively, P represents a pixel size defined according to a resolution in the sub-scanning section in the scanning optical system, and $\Delta L$ represents a distance in the sub-scanning direction between the deflection point of the deflection surface and the surface vertex of the incident surface of the scanning optical element having an optical power in the sub-scanning direction.

20. An optical scanning apparatus according to claim 19, wherein the scanning optical element is a scanning lens.

21. An optical scanning apparatus according to claim 19, wherein each of the plurality of the scanning optical systems further comprises a refractive scanning optical element having optical power in the main scanning direction, and wherein the scanning optical element having optical power in the sub-scanning direction gradually weakens from an on-axis position toward an off-axis position.

22. An optical scanning apparatus according to claim 19, wherein the principal ray of the beam to be incident on the scanning optical element having optical power in the sub-scanning direction is incident thereon at an angle with respect to an optical axis thereof and the optical axis thereof is decentered in parallel to a normal to the deflection surface.

23. An optical scanning apparatus according to claim 19, wherein an optical axis of the scanning optical element having optical power in the sub-scanning direction is decentered rotationally.

24. An optical scanning apparatus according to claim 19, wherein a plurality of beams are guided to each of the surfaces to be scanned.

25. A color image forming apparatus, comprising a plurality of photosensitive drums each for forming respective images different from each other in color, each of the plurality of the photosensitive drums disposed on the respective surfaces to be scanned, different from one another, of an optical scanning apparatus according to claim 19.

26. A color image forming apparatus according to claim 25, further comprising a printer controller that converts data signals inputted from an external device to a plurality of image data different from one another in color and inputs the plurality of image data to the optical scanning apparatus.

* * * * *

UNITED STATES PATENT AND TRADEMARK OFFICE
CERTIFICATE OF CORRECTION

PATENT NO. : 6,987,594 B2  Page 1 of 1
APPLICATION NO. : 10/771401
DATED : January 17, 2006
INVENTOR(S) : Hidemi Takayama It is certified that error appears in the above-identified patent and that said Letters Patent is hereby corrected as shown below:

COLUMN 7
    Line 3, "subs-canning" should read --sub-scanning--.

COLUMN 19
    Line 28, "$(\beta_{max} - \Delta_{min}) < P/\Delta L$," should read --$(\beta_{max} - \beta_{min}) < P/\Delta L$,--.

COLUMN 20
    Line 31, "$(\beta_{max} - \Delta_{min}) < P/\Delta L$," should read --$(\beta_{max} - \beta_{min}) < P/\Delta L$,--;
    Line 51, "claim 19," should read --claim 21,--;
    Line 56, the first occurrence of "thereof" should read --thereof,--. and
    Line 58, "claim 19," should read --claim 21,--.

Signed and Sealed this

Twenty-second Day of August, 2006

JON W. DUDAS
*Director of the United States Patent and Trademark Office*